United States Patent Office 3,539,576
Patented Nov. 10, 1970

1

3,539,576
1,2,3,7,8,12b-HEXAHYDROBENZO[1,2]CYCLO-
HEPTA[3,4,5 - d,e]ISOQUINOLINOMETHYL-
ENEAMIDOXIMES AND ESTERS THEREOF
Martin A. Davis, Montreal, Quebec, and Leslie G. Humber, Dollard des Ormeaux, Montreal, Quebec, Canada, assignors to American Home Products Corporation, New York, N.Y., a corporation of Delaware
No Drawing. Filed July 17, 1967, Ser. No. 653,636
Int. Cl. C07d 39/00
U.S. Cl. 260—286                                    9 Claims

ABSTRACT OF THE DISCLOSURE

There is disclosed herein the compound 1,2,3,7,8,12b-hexahydrobenzo[1,2]cyclohepta[3,4,5 - d,e]isoquinolinomethyleneamidoxime, its dihydrochloride salt, and its O-acetate, O-butyrate, O-benzoate, O-p-chlorobenzoate, and O-phenylacetate. The compounds are useful as antibacterial, trichomonacidal, and hypotensive agents, and the intermediate 2-cyanomethyl derivatives as well as methods for their preparation and use are also disclosed.

This invention relates to novel chemical compounds having useful biological properties and to the novel intermediates used in their preparation. More particularly, this invention relates to novel amidoximes and o-acyl substituted amidoximes of the following Formula I:

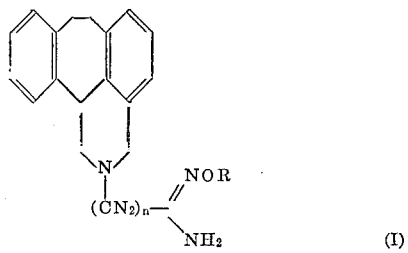

in which $n$ represents an integer of from one to four and R represents hydrogen or an acyl group containing of from two to eight carbon atoms, such as, for example, the acetyl, propionyl, butyryl, benzoyl, p-chlorobenzoyl or phenylacetyl groups.

This invention also relates to the salts of the basic compounds of Formula I with pharmacologically acceptable acids. Such salts are pharmacologically equivalent to the compounds themselves.

The novel compounds of Formula I may be prepared from the known starting material namely 1,2,3,7,8,12b-hexahydrobenzo[1,2]cyclohepta[3,4,5 - d,e]isoquinoline of Formula II which is itself prepared as described in J. Heterocyclic Chem., 3, 247 (1966). The material is converted to an N-cyanoalkyl derivative of Formula III by interaction with an appropriately substituted nitrile of the formula $X(CH_2)_nCN$ in which $n$ is as defined above, and X is a reactive group capable of interaction with an amine such as, for example, a halogen atom. In the particular case where $n$ equals 1 the cyanomethyl compound of Formula III is conveniently prepared from the second-

2 ary amine of Formula II by interaction with an aqueous solution of glycolonitrile, $HOCH_2CN$, is an inert solvent capable of dissolving both reactants such as, for example, ethanol. The reaction is carried out at elevated temperatures, preferably that of boiling ethanol for periods of time of from one to five hours. The cyanomethyl compound is then isolated in the conventional manner and is purified by recrystallization from an appropriate solvent, for example, ethyl acetate-hexane. The cyanomethyl intermediate obtained as above, is then converted to the corresponding amidoxime derivative of Formula I in which R represents hydrogen by interaction with a color excess of hydroxylamine in refluxing ethanol. The reaction is allowed to proceed to completion by refluxing for about 20 hours and the resulting amidoxime is isolated in the conventional manner. It may be converted to an acid addition salt by treatment with a molar excess of a pharmacologically acceptable, non-toxic organic or inorganic acid, such as, for example, hydrochloric, hydrobromic, sulfuric, phosphoric, maleic, or fumaric acid. The resultant salt may then be purified by recrystallization from an appropriate solvent. In order to prepare the o-acylated amidoximes of Formula I in which R represents an acyl group the compound of Formula I in which R represents hydrogen is treated with an acylating agent in the presence of an acid binding reagent. Exemplary of such acylating agents are acid halides such as, for example, benzoyl chloride, or acid anhydrides such as, for example, acetic anhydride. The acid-binding reagent may be an organic tertiary amine, preferably pyridine; in this case the reagent acts as solvent for the reactants. The acylation is carried out at temperatures ranging from 20 to 70° C. and the product is isolated and purified in the conventional manner.

The novel compounds of Formula I have useful antibacterial properties against gram-positive and gram-negative pathogenic microorganisms for example, *Staphylococcus pyogenes*, both penicillin-resistant and penicillin-sensitive strains, *Sarcina lutea*, *Streptococcus fecalis*, *Escherichia coli*, *Aerobacter aerogenes*, *Salmonella pullorum*, *Pseudomonas aeruginosa*, *Proteus mirabilis*, and *Proteus vulgaris*, and are useful as antibacterial agents. For this purpose they may be formulated with suitable excipients as lotions, ointments or creams containing from 0.1 to 2.0 percent of the active ingredient. Such lotions, ointments, or creams may be advantageously applied topically to infected areas of the skin several times daily. The novel compounds also have trichomonacidal activity against the parasitic organism *Trichomonas vaginalis* and are useful as trichomonacidal agents. For such use they may be formulated with suitable excipients in the form of vaginal inserts and vaginal suppositories, each containing from 50 mg. to 500 mg. of the active ingredient, to be administered from two to four times daily for periods of time of from two to several weeks.

The compounds of this invention of Formula I in which R represents hydrogen in the form of its dihydrochloride salt also has hypotensive activity, and is useful as a hypotensive agent. For that purpose it may be dissolved in a pharmaceutically acceptable sterile solvent and may be administered by intravenous injection in doses of from 0.2–2.0 mg. per kilogram body weight as required.

The following formulae and descriptive examples will illustrate this invention but are not construed to limit it

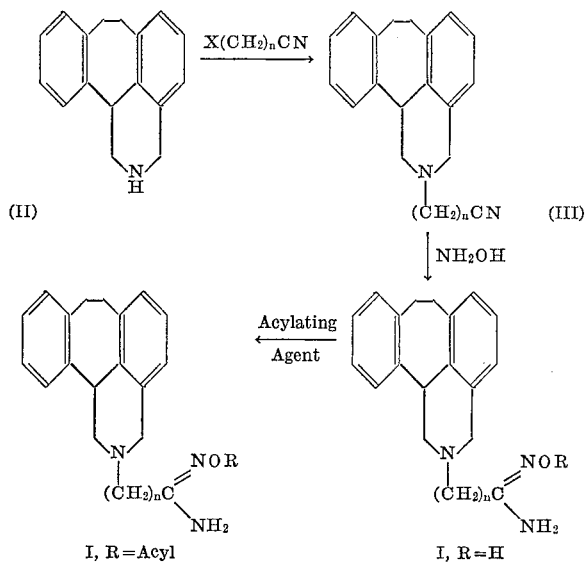

EXAMPLE 1

2-cyanomethyl-1,2,3,4,7,8,12b-hexahydrobenzo-[1,2]cyclohepta[3,4,5-d,e]isoquinoline To 1,2,3,7,8,12b - hexahydrobenzo[1,2]cyanohepta-[3,4,5-d,e]isoquinoline (II, 23.5 g., 0.1 mole) in absolute ethanol (150 ml.) there is added dropwise, with stirring, 70% aqueous glycolonitrile (16.4 g., 0.2 mole). The mixture is heated under reflux and stirred for 2 hours. The cream-coloured precipitated product is collected by filtration, washed with a little cold ethanol, and dried to furnish the title compound with M.P. 119–121° C. after recrystallization from ethyl acetate-hexane.

EXAMPLE 2

1,2,3,7,8,12b-hexahydrobenzo[1,2]cyclohepta[3,4,5-d,e]-isoquinolinomethyleneamidoxime, and dihydrochloride salt thereof To a solution of the 2-cyanomethyl derivative obtained as described in Example 1 (18.0 g., 0.066 mole) in hot ethanol (500 ml.) there is added dropwise, with stirring, a solution of hydroxylamine base (4.35 g., 0.132 mole) in ethanol, prepared by stoichiometric addition of sodium methoxide (7.2 g.) to hydroxylamine hydrochloride (9.25 g.). The reaction mixture is heated under reflux for 20 hours. The solvent is removed in vacuo and the residue stirred in hexane to furnish the title compound as a white solid, M.P. 202–204° C. (dec.).

The dihydrochloride salt thereof is obtained by dissolving the base in methanolic hydrogen chloride and diluting with ether. Recrystallization from ethanol-ether gives the dihydrochloride salt with M.P. 187–189° C.

EXAMPLE 3

1,2,3,7,8,12b-hexahydrobenzo[1,2]cyclohepta[3,4,5-d,e]-isoquinolinomethyleneamidoxime-O-acetate The amidoxime base obtained as described in Example 2 (8.8 g., 0.029 mole) is heated at 65–70° with anhydrous pyridine (80 ml.) and acetic anhydride (3.2 g., 0.031 mole) for 30 minutes. The reaction mixture is then poured into water and extracted into chloroform. Concentration of the organic layer in vacuo and addition of anhydrous ether to the residue precipitates crystals which are recrystallized from acetonitrile to yield the title compound with M.P. 156–157° C. (dec.).

In the same manner, by using propionic or butyric anhydride instead of acetic anhydride, the corresponding o-propionate and o-butyrate of 1,2,3,7,8,12b-hexahydrobenzo[1,2]cyclohepta[3,4,5 - d,e]isoquinolinomethyleneamidoxime are also obtained.

EXAMPLE 4

1,2,3,7,8,12b-hexahydrobenzo[1,2]cyclohepta[3,4,5-d,e]-isoquinolinomethyleneamidoxime-O-benzoate To a cooled solution of the amidoxime base obtained as described in Example 2 (7.69 g., 0.025 mole) in pyridine there is added, with vigorous agitation, benzoyl chloride, (3.52 g. 0.025 mole), and the mixture is kept at room temperature overnight. It is then poured into ice-cold water and the gummy precipitate collected and triturated with boiling water to afford a brown solid which is recrystalized from benzene-hexane to yield the title product as a homogeneous compound with a melting range of 120°–137° C.

In the same manner, by using p-chlorobenzoyl chloride or phenyl acetyl chloride instead of benzoyl chloride, the corresponding o-p-chlorobenzoate and o-phenylacetate of 1,2,3,7,8,12b - hexahydrobenzo[1,2]cyclohepta[3,4,5-d,e]isoquinolinemethyleneamidoxime are also obtained.

We claim:

1. A compound selected from the group which consists of those of the formula

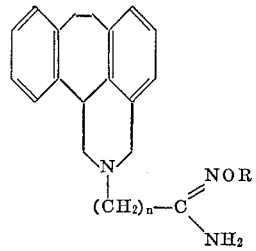

wherein $n$ is an integer of from one to four and R is selected from the group which consists of hydrogen, acetyl, propionyl, butyryl, benzoyl, p-chlorobenzoyl and phenylacetyl; and salts thereof with pharmacologically acceptable acids.

2. 1,2,3,7,8,12b-hexahydrobenzo[1,2]cyclohepta-[3,4,5-d,e]isoquinolinomethyleneamidoxime, as claimed in claim 1.

3. 1,2,3,7,8,12b-hexahydrobenzo[1,2]cyclohepta-[3,4,5-d,e]isoquinolinomethyleneamidoxamine - O - acetate, as claimed in claim 1.

4. 1,2,3,7,7,12b-hexahydrobenzo[1,2]cyclohepta-[3,4,5-d,e]isoquinolinomethyleneamidoxime - O - propionate, as claimed in claim 1.

5. 1,2,3,7,8,12b-hexahydrobenzo[1,2]cyclohepta-[3,4,5-d,e]isoquinolinomethyleneamidoxime - O - butyrate, as claimed in claim 1.

6. 1,2,3,7,8,12b-hexahydrobenzo]1,2]cyclohepta-[3,4,5-d,e]isoquinolinomethyleneamidoxime - O - benzoate, as claimed in claim 1.

7. 1,2,3,7,8,12b-hexahydrobenzo[1,2]cyclohepta-[3,4,5-d,e]isoquinolinomethyleneamidoxime - O - p-chlorobenzoate, as claimed in claim 1.

8. 1,2,3,7,8,12b-hexahydrobenzo[1,2]cyclohepta-[3,4,5-d,e]isoquinolinomethyleneamidoxime - O - phenylacetate, as claimed in claim 1.

9. The dihydrochloride salt of 1,2,3,7,8,12b-hexahydrobenzo[1,2]cyclohepta - [3,4,5-d,e]isoquinolinomethyleneamidoxime, as claimed in claim 1.

(References on following page)

References Cited

UNITED STATES PATENTS

| | | | |
|---|---|---|---|
| 2,951,843 | 9/1960 | Haack | 260—288 |
| 3,157,573 | 11/1964 | Wenner | 260—288 X |
| 3,314,963 | 4/1967 | Koch | 260—288 |
| 3,354,162 | 11/1967 | Humber et al. | 260—288 X |
| 3,420,847 | 1/1969 | Bell | 260—288 X |

OTHER REFERENCES

Humber et al.: Jour. Het. Chem., vol 3, pp. 247–51 (1966).

DONALD G. DAUS, Primary Examiner

U.S. Cl. X.R.

260—287, 288, 465.6, 544, 546; 424—258